Dec. 30, 1958  E. A. STALKER  2,866,616
FABRICATED BLADED STRUCTURES FOR AXIAL FLOW MACHINES
Filed March 2, 1951  2 Sheets-Sheet 1
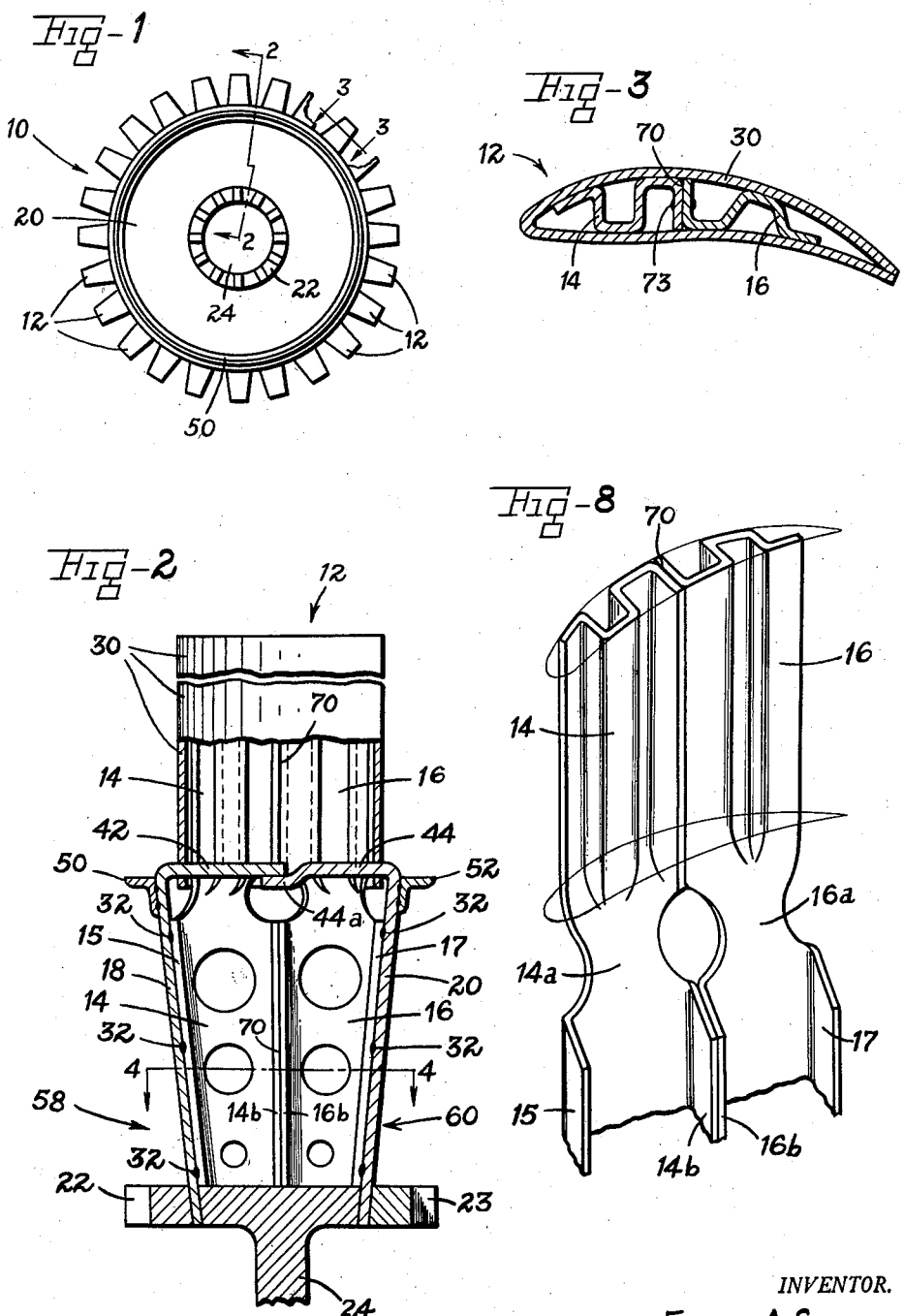
INVENTOR.
EDWARD A. STALKER
BY
ATTORNEYS Dec. 30, 1958  E. A. STALKER  2,866,616
FABRICATED BLADED STRUCTURES FOR AXIAL FLOW MACHINES
Filed March 2, 1951  2 Sheets-Sheet 2
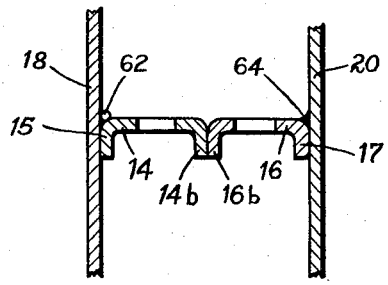
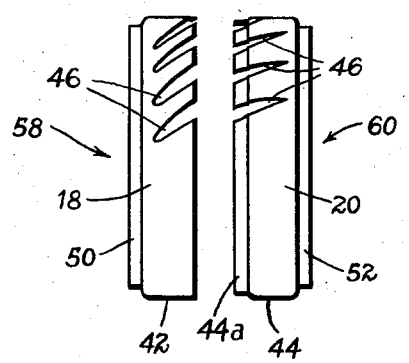
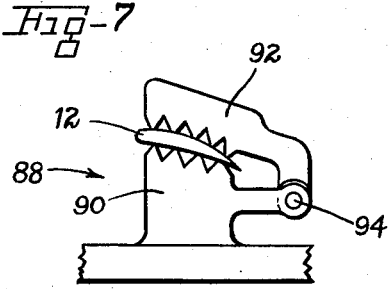
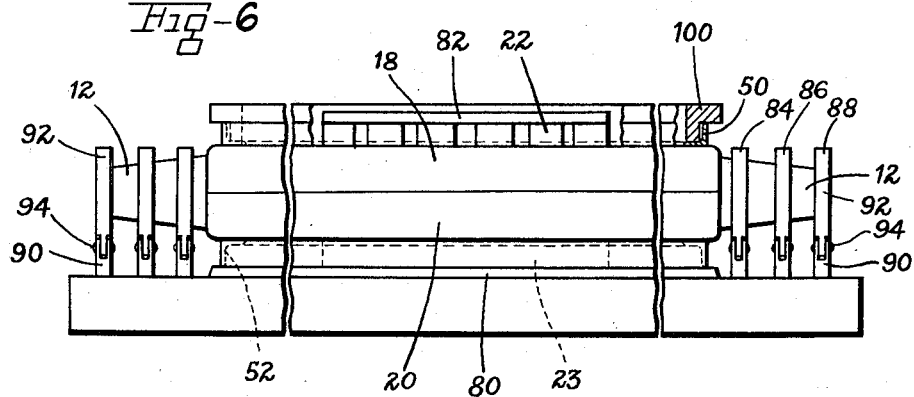
INVENTOR.
EDWARD A. STALKER
BY
ATTORNEYS

United States Patent Office 2,866,616
Patented Dec. 30, 1958

2,866,616

FABRICATED BLADED STRUCTURES FOR AXIAL FLOW MACHINES

Edward A. Stalker, Bay City, Mich., assignor to The Stalker Development Company, Bay City, Mich., a corporation of Michigan Application March 2, 1951, Serial No. 213,595

6 Claims. (Cl. 253—39)

My invention relates to bladed structures of the axial flow type for fluid machines which interchange forces or energy with a fluid such as compressors and turbines.

An object of my invention is to provide a rotor of thin walls as of sheet metal which is light and economical to produce.

Other objects will appear from the description, drawings and claims.

The parts of the bladed structure are fabricated by stamping or pressing from sheet metal. These parts are fixed together to form the bladed structure such as a rotor. Preferably the parts are fused together as by brazing.

When parts are brazed together their faying surfaces must be very close together or the brazing material will not wet both of them. If both surfaces are close together the brazing material will flow by capillary action into the joints. It is well known that the gap between surfaces should be about 0.003 inch or smaller for the faying surfaces to be joined. To assure the necessary close fits, elaborate jigs and fixtures may be required and then the cost of the structure may be too great.

In cases where the parts to be joined are inside of other parts the problem of providing the close tolerances is very great. This invention is concerned with means of producing structures such as bladed rotors wherein internal parts are held together in close relation with a minimum of fixtures and with assurances that the parts will be fused together. This is particularly important where the closed structure precludes visual inspection to determine the success of the brazing operation.

The above objects are accomplished by the means illustrated in the accompanying drawings in which—

Fig. 1 is an axial view of a rotor structure according to this invention;

Fig. 2 is a fragmentary axial section of the rotor of Fig. 1 along the line 2—2;

Fig. 3 is a section of a blade along line 3—3 in Fig. 1;

Fig. 4 is a fragmentary section along line 4—4 in Fig. 2;

Fig. 5 is a plan view of the pair of flanged side plates prior to assembly showing several of the cut-outs for the blades in the flanges of the side plates;

Fig. 6 is a side elevation of the rotor in a brazing fixture with portions broken away;

Fig. 7 is a fragmentary end view of a blade in the brazing fixture; and

Fig. 8 is a view in perspective of an adjacent pair of the blade stems showing the way in which the envelope is received thereover.

Referring now to the drawings the rotor is indicated as 10 and includes the blades 12, the stems 14 and 16, the side plates 18 and 20, the clutches 22 and 23, and the hub 24, the clutches providing for coupling between the rotor stage and other stages or shaft members to transmit driving torque thereto or therefrom.

Each blade is comprised of an envelope 30 carried by two stems 14 and 16. These are corrugated within the blade as shown particularly in Fig. 3. The envelope is brazed to the corrugations along the faying surfaces. The necks 14a and 16a of the stems are twisted to give the blades the pitch angle shown in Fig. 5.

The feature of an envelope wrapped about a stem is disclosed by David J. Clarke in his copending Patent No. 2,802,619.

The lower ends of the stems, as shown in Fig. 2 and Fig. 4 are of channel cross section with suitable lightening holes. The flanges 15 and 17 of the stems 14 and 16, respectively, faying with the side plates 18 and 20 are fixed thereto by spot welding at such spot as 32.

The side plates 18 and 20 have inturned flanges 42 and 44 respectively at their upper ends. These flanges have cut-outs 46 for the blade envelopes and stems to pass through. Only four such cut-outs are shown cut in Fig. 5 but the number of cut-outs would equal the number of blades peripherally spaced about the whole perimeter as shown in Fig. 1.

The portion of the rotor attached to the hub 24 is arranged so that, before the blade envelopes are put in place, this portion is in two assemblies 58 and 60 comprising the hub structure. The front assembly 58 comprises the hub plate 18, the series of circumferentially spaced stems 14, the clutch piece 22, and the spacer rim 50. The flange 15 of each stem 14 is spot welded to one face of hub plate 18 at a number of points such as 32. The rim 50 is also spot welded to the opposite face of plate 18 at a number of peripherally spaced spots.

These spot-welding operations are made possible by supporting the blade envelope on the two stems 14 and 16 rather than on one, because this makes two separate assemblies and it is then possible to get at both sides of the hub plates to execute the spot-welding operations. This also provides for the blade load to be carried to both side plates 18 and 20.

In like manner the hub plate 20 is assembled with its stems 16, clutch 23 and spacer rim 52 to form assembly 60.

The hub plates 18 and 20 may constitute the side plates of the rotor as shown in the figures.

Brazing material such as copper wire 62, Fig. 4, may be stuck in the joints, or braze paste may be painted along the joints as at 64 so that when the structure is heated the braze metal will melt and flow between the surfaces by capillary action. The spot welds hold the parts in properly close relation and holding fixtures are not required for such parts.

The two assemblies 58 and 60 are brought into relationship with the flange 42 of hub plate 18 registering properly with the joggle 44a in flange 44 thus forming a rim means extending from the leading to the trailing edges of the blades and peripherally from blade to blade to effectively close the gaps between the blades. The corrugated portions of the stems are preferably in contact along the line 70. If desired these may be held together by a spot weld near their tip or by a rivet 73 as shown in Fig. 3. Similarly the inner flanged portions of the stems are in contact at flanges 14b and 16b.

The envelope 30 is placed over the stems and pushed downward through the rim openings 46 to unite the two assemblies.

The envelopes are preferably spot-welded at several points along the trailing edges before they are slipped over the stems.

Brazing material is placed at the joints to be brazed, as metal clips, or paste and the like according to well known methods.

Braze material may be placed between the flanges 14b and 16b to obtain as much fused area as will result. But reliance is not placed on this joint for any significant contribution to strength since the close contact of these two flanges cannot be assured when the assembly is heated in the brazing furnace. The main load from the blade is divided so that each side plate receives some from its attached stem and the two carry the centrifugal load of the blade.

The assembly with the brazing material properly in place is then preferably placed in a fixture to hold the blades at the proper pitch angles while the whole assembly is heated sufficiently to cause the brazing material to flow into all the joints.

The brazing material may be of various kinds such as copper, silver solder or such high temperature solders such as Nicrobraze.

As shown in Fig. 6 the fixture comprises the lower plate or bed 80, an upper plate 82 and the blade supporting elements 84, 86 and 88. Each of these is comprised of an anvil 90 and a weight 92, hinge supported at 94, which presses the blade against the former. The upper plate 82 applies pressure to the clutch parts 22.

Although the rims 50 and 52 are spot welded to hold them in place it may in some instance be desirable to place a heavy fixture member 100 on one of the rims as 50 to press on it. As shown in Fig. 6 this member is a ring of angle cross section.

The important structural joints for supporting the blades are those between the side plates 18 and 20 and the faying stem flanges 15, 17. These carry the main load which is the centrifugal load of blades and after the assembly is made it is not possible to visibly inspect the joints. Therefore the assembly must provide great assurance that the brazed joint is structurally sound. This assurance is provided by the spot welding of the flanges (which is made possible by the use of the two separate stems) and the certainty that the flanges are substantially in contact with the side plates 18, 20.

In contemporary practice the blades have a heavy machined root fitting or base which fits into a recess in the rim of a solid rotor disk or hub. The rim is heavy to accommodate the blade bases and sustain the heavy loads from the blades and their bases. In many instances the base or root fitting weighs about as much as the blade itself. Then the thickness of the disk adjacent to the rim has to be heavy to carry not only the blade loads but also the extra load of the rim made heavy by the type of blade attachment.

If proper proportions are used a rotor fabricated according to this invention from sheet metal pressings can be lighter by about 40% than a machined rotor following contemporary practice. That is if the blade is made with a wall of limited thickness, as is practical according to this invention, and the blade is then attached without a heavy blade root fitting or comparable means requiring a disk rim, then the disk rim can be dispensed with and the disk itself can be very thin such as pieces of sheet metal.

The blade wall thickness can be of the order of 1.5% of the blade chord length or less, preferably less than about 1% of the chord length.

Thus the blade wall thickness can be of the order of 0.020 in. or less depending on the size of the blade. For instance a blade having a root chord of 2 in. can readily employ a wall thickness of 0.018 in. If such a blade is fixed to rotor side plates by brazing as described herein, no disk or plate rim is necessary. The thin walled blade and the light rim makes possible side disks or plates whose thickness aggregate a total thickness less than 10 times the blade wall thickness.

In other words by limiting the blade wall thickness and the blade root fitting, the rim of the rotor side disks can be limited and these in turn establish an upper limit of disk thickness within which the stresses can be low enough for the employment of sheet metal construction. Actually in sheet metal construction according to this invention the disk rim is indistinguishable from the disk portions adjacent the perimeter of the disk since they are of the same limited thickness.

While I have illustrated specific forms of the invention, it is to be understood that variations may be made therein and that I intend to claim my invention broadly as indicated by the appended claims.

What is claimed is:

1. In combination in an axial flow bladed rotor adapted to interchange force with a fluid, a hub structure comprising a front assembly and a rear assembly supported in axially tandem relationship, each said assembly comprising a hub plate and a plurality of separate radially directed blade stems, each said stem having flanges defining a channel cross section thereof, one said flange of each stem extending radially inwardly in overlapping relation and faying with its said plate and being fixed thereto, each said stem extending radially outward beyond the perimeter of its respective said plate, a plurality of blade envelopes each enclosing and being fixed to a stem of each said assembly to unite said assemblies forming a plurality of peripherally spaced blades, the flanges of the stem of one said assembly abutting each with a flange of a stem of the other said assembly, and axially extending flanges on said hub structure assemblies closing the spaces between the several blades.

2. In an axial flow bladed rotor having a plurality of blades and adapted to interchange a force with a fluid, a hub structure comprising a front assembly and a rear assembly supported in axially tandem relation, each said assembly including a sheet metal hub plate extending radially outwardly and having an axially inturned flange with apertures therein extending from one edge and corresponding to the shape of the roots of said blades, a plurality of circumferentially spaced stems secured to each said plate along the radial extent thereof and projecting outwardly beyond said flange, said two hub assemblies being located adjacent each other with corresponding apertures in the respective flanges matching to define the contour of the blade root, and an outer blade envelope overlying and fixed to each said pair of outwardly projecting stems forming each said blade and having its root portion received within said matched apertures.

3. In an axial flow bladed rotor having a plurality of blades and adapted to interchange a force with a fluid, a hub structure comprising a front assembly and a rear assembly supported in axially tandem relation, each said assembly including a hub plate extending radially outwardly and having an axially inturned flange defining a peripheral surface with apertures therein corresponding to the shape of the roots of said blades, a plurality of circumferentially spaced stems fixedly secured to each said plate along the radial extent thereof and projecting outwardly beyond said flange, the outer portions of said stems being twisted relative to the radially inner portions thereof to locate the chord of said blade at a predetermined angle relative to the axis of rotation, said two hub assemblies being located adjacent each other with corresponding apertures in the respective flanges matching to define the contour of the blade root, and an outer blade envelope overlying and fixed to each said pair of outwardly projecting stems forming each said blade and having its root portion received within said matched apertures.

4. In combination in an axial flow bladed rotor adapted to interchange force with a fluid, a hub structure comprising a front assembly and a rear assembly supported in axially tandem relationship, each said assembly comprising a generally annular hub plate and a plurality of separate radially directed blade stems each fixed to its respective said plate by fused metal over a substantial radial extent of faying surface, each said stem extending radially outward beyond the perimeter of its respective said plate with corresponding stems of each said assembly being located adjacent each other, a plurality of blade envelopes each enclosing and being fixed to a stem of each said assembly to unite said assemblies and to form said bladed rotor, and rim means on said rotor at the roots of said blades effectively closing the gaps between said blades and extending from the leading to the trailing edges of said blades.

5. In combination in an axial flow bladed rotor adapted to interchange force with a fluid, a hub structure comprising a front assembly and a rear assembly supported in axially tandem relationship, each said assembly comprising a sheet metal hub plate and a plurality of separate radially directed blade stems each permanently fixed over a substantial radial extent of faying surface to its respective said plate with the stems of said respective assemblies arranged in pairs adjacent each other, said stems being fixed on said plates on the inner surfaces thereof facing each other, each said stem extending radially outward beyond the perimeter of its respective said plate, a plurality of blade envelopes each enclosing and being fixed to each said pair of stems to unite said assembly and to form said bladed rotor, and rim means on said rotor at the roots of said blades extending from the leading to the trailing edges thereof and effectively closing the gaps between said blades.

6. In combination in an axial flow bladed rotor adapted to interchange force with a fluid, a hub structure comprising a front assembly and a rear assembly supported in axially tandem relationship, each said assembly comprising a generally annular hub plate and a plurality of separate radially directed blade stems, each said stem having a flange extending radially inwardly in overlapping relation and faying with its said plate and fixed thereto by fused metal over a substantial radially extending surface, each said stem extending radially outward beyond the perimeter of its respective said plate, a plurality of blade envelopes each enclosing and being fixed to a stem of each said assembly to unite said assemblies, and rim means on said rotor at the roots of said blades extending from the leading to the trailing edges thereof and effectively closing the gaps between said blades.

References Cited in the file of this patent

UNITED STATES PATENTS

| | | |
|---|---|---|
| 648,158 | Zoelly | Apr. 24, 1900 |
| 1,036,627 | Huguenin | Aug. 27, 1912 |
| 1,325,208 | Rice | Dec. 16, 1919 |
| 1,363,692 | Summers | Dec. 28, 1920 |
| 1,603,966 | Lorenzen | Oct. 19, 1926 |
| 1,919,970 | Woods | July 25, 1933 |
| 1,930,285 | Robinson | Oct. 10, 1933 |
| 1,959,220 | Robinson | May 15, 1934 |
| 2,259,247 | Dornier | Oct. 14, 1941 |
| 2,309,899 | Hepperle | Feb. 2, 1943 |
| 2,475,772 | Allen | July 12, 1949 |
| 2,501,038 | Fransson | Mar. 21, 1950 |
| 2,553,078 | Buck | May 15, 1951 |
| 2,559,013 | Eastman | July 3, 1951 |
| 2,604,298 | Bachle | July 22, 1952 |

FOREIGN PATENTS

| | | |
|---|---|---|
| 595,643 | Great Britain | Dec. 11, 1947 |
| 625,693 | Great Britain | July 1, 1949 |